Sept. 10, 1957 E. F. WOODS 2,806,082
MEANS FOR DETECTING AND INDICATING THE ACTIVITIES
OF BEES AND CONDITIONS IN BEEHIVES
Filed Oct. 26, 1953 2 Sheets-Sheet 1

Inventor
E. F. Woods
By
Attorneys

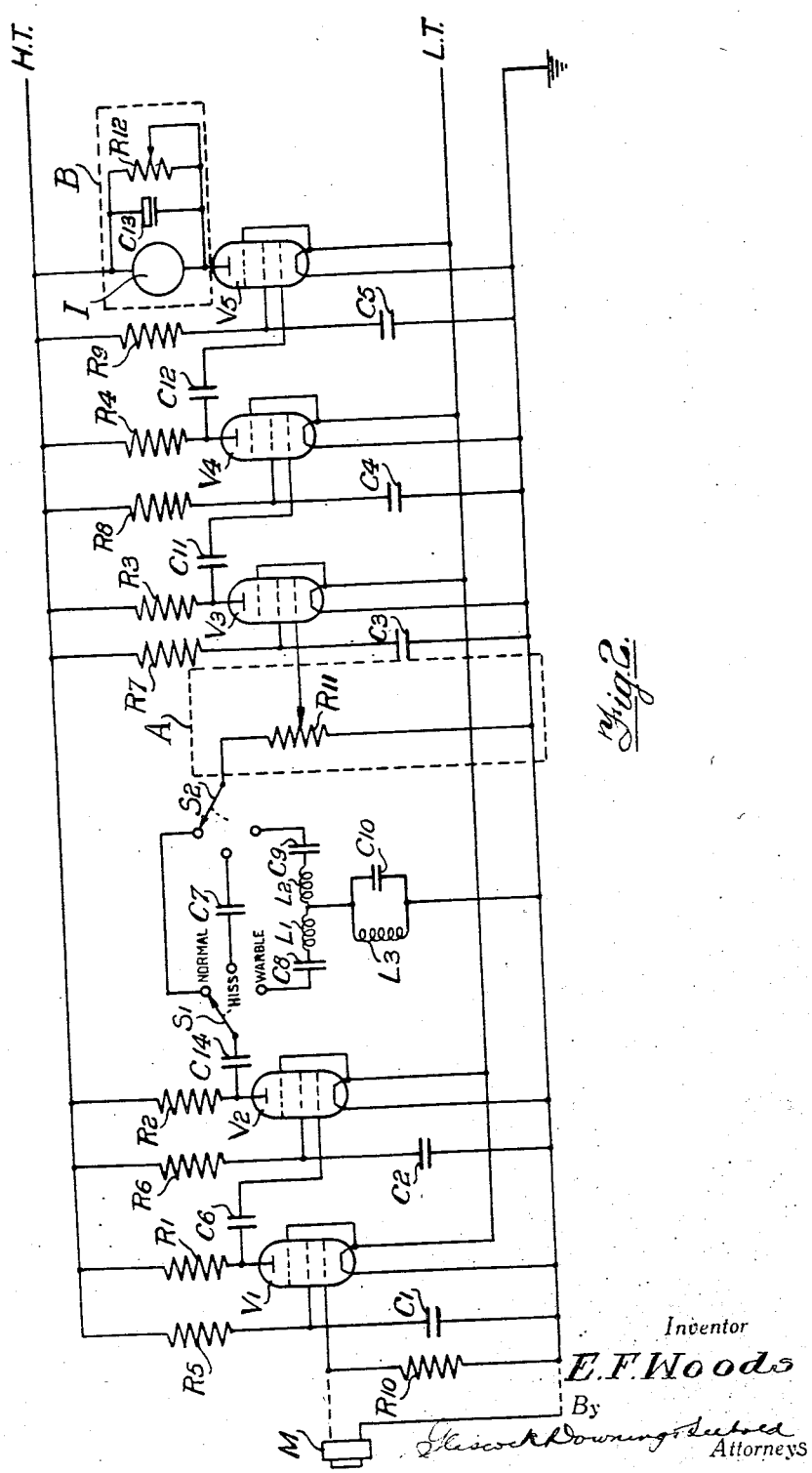

United States Patent Office 2,806,082
Patented Sept. 10, 1957

2,806,082

MEANS FOR DETECTING AND INDICATING THE ACTIVITIES OF BEES AND CONDITIONS IN BEEHIVES

Edward Farrington Woods, Hinchley Wood, England

Application October 26, 1953, Serial No. 388,214

Claims priority, application Great Britain October 31, 1952

3 Claims. (Cl. 179—1)

This invention relates to the art of bee-keeping and has for its object to provide means for enabling the bee-keeper to obtain more accurate and definite information concerning the activities within a hive and the potential behaviour of its inmates than has been possible by the methods hitherto employed, but in a simpler and more economical manner, and with less disturbance to the bees, and with results noted later.

It is well known that under varying conditions, different sounds emanate from bees within or without the hive and it is by attempting to distinguish between the normal sound of a colony and the variable note due to disturbances within the colony that the applicant has established that knowledge can be obtained of the imminence of swarming and other phenomena. Similarly, different sounds emitted by both queen and worker bees indicate the presence of a virgin queen, the presence of a mated queen or whether a queen is laying. These are only a selection of the phenomena which accompany hive sounds but often these sounds are faint and overlaid so that unless the listener is of quick hearing and experienced in detecting and interpreting these sounds, their significance is liable to be missed, the necessary precautions are not taken and, for example, a queen may be lost, or unexpected or uncontrolled swarming take place.

In order to provide the bee-keeper with accurate data on which to base his operations the present invention provides a detecting and indicating apparatus which includes a microphone or similar device for insertion in a beehive and connected to electrical or acoustic detecting and amplifying apparatus provided with means for frequency discrimination, such means being operable to select the frequency of the emitted sound and thereafter to operate a meter or the like to indicate the condition or activity within the hive.

Figure 1:
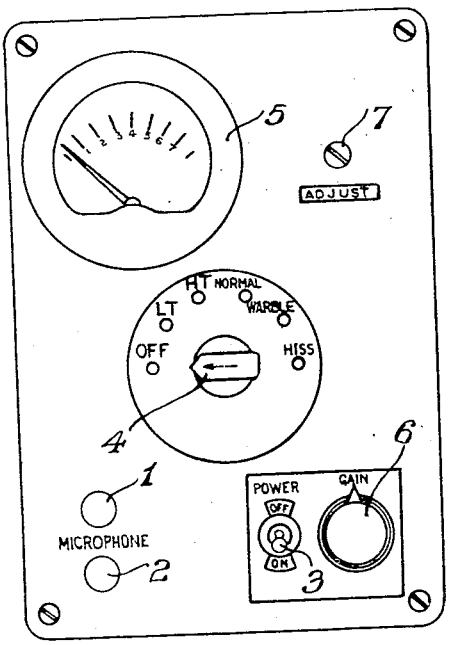
Figure 2A:
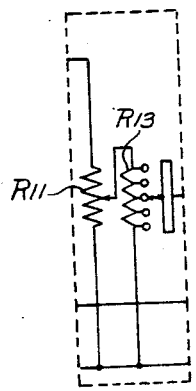

An embodiment of the invention will now be described with reference to the accompanying drawings of which:

Fig. 1 is a view of the front of an electrical control and indicating device according to the invention, Fig. 2 is a circuit diagram of the device shown in Fig. 1, and Figs. 2A and B show modifications which may be made to parts of the circuit shown in Fig. 2.

In this embodiment, the means for detecting the sound within the hive is assumed to be a crystal microphone of suitable size and shape for insertion in the hive without being interfered with by the bees. This microphone is connected to the terminals 1 and 2 on the front of the device shown in Fig. 1 although the microphone is not shown in that figure. The signals picked up by the microphone are applied to a five stage electronic amplifier shown in Fig. 2. The power supply to this amplifier is switched on by the switch 3 in Fig. 1. As will be described more fully later, the electrical circuit of the amplifier incorporates a frequency selective arrangement controlled by the selector switch 4 and an indicating device shown at 5. The selector switch 4 is capable of occupying a number of positions indicated in Fig. 1 including two marked "warble" and "hiss" which represent sounds generated under particular conditions by a bee colony. Means is provided for varying the gain of the amplifier by a knob 6 and the indicator 5 is provided with an adjusting device 7.

If with the switch 3 on and the microphone connected, the selector switch 4 is turned to the "normal" position, the indicator 5 will, under normal conditions, be deflected to indicate the hum which, as is well known in the art of bee-keeping, is generated by a healthy colony of bees during a quiet period. This sound has a fundamental frequency of about 180–190 cycles per second and the fundamental tone can be distinguished very easily.

The applicant has found that certain sounds produced by bees of fundamental importance in detecting occurrences within the hive are so feeble as to be normally almost inaudible but their import can be rendered definite by the use of the detector forming the subject of the present invention. Variations in the intensity or duration of these sounds are indications of different conditions but accurate use of these variations is only possible by means of the apparatus forming the subject of the present invention. These sounds are:

*Hiss.*—This is a complex, random, transient sound, predominantly 3000 C. P. S. and upwards.

*Warble.*—This is a fairly pure tone, wavering in pitch. It is about 255 C. P. S. plus or minus 35 C. P. S.

These two sounds may be used as follows:

*Hiss.*—If a healthy normal colony be disturbed by, say, a blow or tap, it will immediately respond with a short sharp hiss, which soon ceases. This reaction can be evoked as many times as desired. Its presence is an indication that there is in the colony a healthy queen. A sluggish rise in hiss, with a slow fade, indicates abnormality. It has been found that by detecting and differentiating between the warble and the hiss, an indication can be obtained which renders the opening of normal colonies unnecessary.

The existence of the warble indicates that the queen's rate of egg laying has diminished. This slackening can be caused by:

(1) An impending swarm. As is well known, the queen, normally heavily fed, is starved for several days before swarming, so that she can fly. Her egg laying dies down and ceases, giving rise to the warble. In field tests the warble has been noted fifteen days before the issue of the swarm. Action is urgently needed to deal with a swarm. The intensity of the warble indicates the time available before issue.

(2) Age or deformity of the queen, leading to her ceasing to lay, and to her "supersedure" in due course. This is a desirable condition, but a check is needed.

(3) Death or removal of the queen.

Conditions 1, 2 and 3 can be distinguished by the observation of the hiss.

In 1 the hiss becomes a sluggish rise and fall, with a maximum intensity much less than normal. At about the time of issue it has vanished.

In 2 the hiss is the normal sudden rise and fall, and short duration.

In 3 the hiss vanishes completely.

All three conditions require immediate investigation. In the case of conditions 1 and 2, queen cells will be noted, and action be taken.

By the use of these sounds, and, assisted by external signs, the inventor claims that no colony need be opened unless it is in emergency, whereas under the old system, all colonies were examined at regular intervals, 90% or more being normal, and therefore not requiring the hive to be opened.

It has been established that if the queen be removed from the colony to be replaced by a younger one—an annual event in normal commercial bee-keeping—the colony, on removal of the old queen will begin to warble and when the warble has reached a well-defined pitch of intensity the new queen may be introduced by "direct introduction" with reasonable certainty of being accepted.

If, however, the colony is left queenless for too long a period, the warble vanishes and is replaced by a sound akin to the "normal" sound but violently varying in volume. This condition is well known in the art as "roaring" indicating that the introduction of a queen to such a colony is very difficult. This period varies from 20–30 minutes to 4 or 5 days. The arrangements according to the invention make it clear to the operator that if he has not introduced the queen by the time the warble reaches its maximum intensity he must take special precautions when he does introduce the queen.

If when the selector is on "normal" the pointer shows violent fluctuations, a state of disturbance within the hive is indicated. The actual sound and its accompanying pointer indications are similar to the "roaring" already referred to but the accompanying external conditions are different and indicate that the colony is being "robbed." This gives advanced warning to the operator so that he may take appropriate action before it is too late.

The phenomena referred to under the headings of "warble" and "hiss" above can be amplified to an audible frequency such that the bee-keeper can readily assess the state of affairs within the hive and thus be prepared in advance to take appropriate action. An example of an electrical circuit suitable for amplification and detection of these sounds is shown in Fig. 2 and comprises five pentode valves V1 to V5 connected in series. The anodes of the first four valves are supplied from a source of H. T. potential (preferably a 45 volt battery) via respective anode load resistors R1 to R4. The cathodes of all five valves are connected on the one side to earth and on the other side to a suitable L. T. supply for energizing their filaments. The suppressor grids are connected to the cathode in each valve in the usual manner while the screen grids are connected to the H. T. line via respective dropping resistors R5 to R9 and to earth by respective condensers C1 to C5.

The signals picked up by the microphone M are applied between the control grid of the valve V1 and earth, in parallel with the grid leak resistor R10. The amplified signals appearing at the anode of valve V1 are fed via a coupling condenser C5 to the control grid of the second amplifying valve V2. The anode of this valve is connected to the control grid of the next valve V3 via a gain control potentiometer resistor R11 and over one of three possible paths as determined by the positions of two ganged switches S1 and S2. These switches are operated from the selector switch 4 in Fig. 1. The condenser C14 is included to prevent the H. T. voltage appearing on the control grid of the valve V3.

When the selector is set to "normal," the switches S1 and S2 are placed in the upper position as shown in Fig. 2 so that there is a direct connection between them. No selectivity is thus included and the normal periodic response is given.

When the selector is set to "hiss," the switches S1 and S2 assume the mid-position in which they are connected through a condenser C7. This eliminates the lower frequencies so that those of 3000 C. P. S. and upwards are only indicated. In this position the rotation of the selector switch 4 is arranged by coupling means, not shown, to adjust the gain control potentiometer R11 to give added gain since the intensity of the "hiss" is considerably less than that of the other two sounds. The potentiometer R11 can also be controlled from the knob 6 in Fig. 1.

With the selector switch set at "warble," the switches S1 and S2 are placed in the lowest position so as to bring into operation a band pass filter circuit comprising series connected condensers C8 and C9, series inductors L1 and L2 and parallel connected inductor L3 and condenser C10. This band pass circuit functions in well known manner to select the "warble" frequency.

The signals thus selected are amplified in the valve V3 and passed via a condenser C11 to the control grid of valve V4. After further amplification in this valve, the signals are applied via a condenser C12 to the input of the final amplifying valve V5.

The meter or indicator I is connected in the anode circuit of the valve V5 and is thus directly influenced by the detected and amplified signals. The indicator is shunted by an electrolytic condenser C13 and is provided with an adjusting resistor R12 controllable from the screw 7 in Fig. 1.

Arrangements can be made (although for simplicity none has been shown) for using the indicator I to indicate the state of the H. T. or L. T. supply. These arrangements are intended to be operable by moving the selector switch 4 in Fig. 1 to the positions marked H. T. and L. T. respectively. Such arrangements are well known in electronic amplifiers.

Figure 2B:
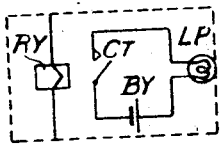

The circuit shown in Fig. 2 may be modified to provide another kind of indication by replacing the parts shown in the rectangles A and B by those in the rectangles of Figs. 2A and 2B respectively. In this modified circuit a resistor R13 provided with a sliding tap is inserted between the gain control potentiometer R11 and the input to valve V3 while the indicator I is replaced by the operating solenoid of a relay RY. The resistor R13 is calibrated in days and its slider is moved until the strength of the incoming signals at the selected frequency is sufficient to operate the relay RY. This relay closes its contact CT so as to light an indicating lamp LP from a local battery BY. Thus the position of the slider of R13 when the relay operates is an indication of the time of issue of the swarm.

The apparatus above described is primarily intended for application directly to a hive but in large bee farms having several hundred colonies each hive may be permanently connected through a switch board whereby the apparatus may be separately connected to each hive in turn in order to determine the conditions prevailing at any time and enable the bee-keeper to apply the appropriate action or treatment. In this case, the apparatus would preferably be mains operated.

The detecting and indicating apparatus according to the invention can be made in a compact and easily portable form enabling it to be carried by hand and applied to a hive without inconvenience, or any disturbance of the bees, or risk to the operator, the whole operation taking a few second as against 15–20 minutes in present day technique.

The portability of the apparatus could be further enhanced by replacing the thermionic valves in the amplifying circuit by the newly developed transistors. Thus in the subsequent claims, the word "electronic" should be interpreted to cover these and any other equivalent devices.

The method provided by the invention renders obsolete the present cumbersome and uneconomic methods of swarm control, requiring frequent disassembly of colonies with heavy insurance of operators, and will further, by avoidance of unnecessary disturbance of colonies, increase materially the yield of honey. The saving is estimated at about £1 per annum per colony, and the increased yield up to 20 lbs. of honey per annum.

I claim:

1. Apparatus for detecting and indicating the activities of bees and conditions in beehives by analysis of the sounds produced by the bees, comprising a microphone adapted to be positioned within a hive, an electronic amplifying circuit connected to the output of the microphone, an indicating device connected to the output of the amplifier, said indicating device being responsive to the amplitude and frequency of the sounds, and a selector switch arranged to switch selectively into the circuit filter circuits having the characteristics for passing signals of the desired frequency so as to selectively isolate the three sounds known as normal hum, hiss and warble.

2. Apparatus as claimed in claim 1, in which the indicating device is a meter with a movable pointer, the meter being fed directly with the amplified signals.

3. Apparatus as claimed in claim 1, in which the indicating device in the form of a lamp is controlled by a relay fed directly with the amplified signals and in which the strength of the signals fed to the relay is controlled by a calibrated variable resistance device.

References Cited in the file of this patent

UNITED STATES PATENTS

| | | |
|---|---|---|
| 1,690,279 | Craft | Nov. 6, 1928 |
| 1,872,372 | Wensley | Aug. 16, 1932 |
| 2,389,949 | Becker | Nov. 27, 1945 |